(12) United States Patent
Hamasaki (10) Patent No.: US 8,757,707 B2
(45) Date of Patent: Jun. 24, 2014

(54) VEHICLE FENDER PANEL MOUNTING STRUCTURE

(75) Inventor: Hitoshi Hamasaki, Okazaki (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 253 days.

(21) Appl. No.: 13/140,349

(22) PCT Filed: Dec. 17, 2009

(86) PCT No.: PCT/IB2009/007791
§ 371 (c)(1),
(2), (4) Date: Jun. 16, 2011

(87) PCT Pub. No.: WO2010/073084
PCT Pub. Date: Jul. 1, 2010

(65) Prior Publication Data
US 2011/0248526 A1   Oct. 13, 2011

(30) Foreign Application Priority Data

Dec. 25, 2008   (JP) ................................. 2008-330856

(51) Int. Cl.
*B62D 25/16*   (2006.01)
(52) U.S. Cl.
USPC .......... 296/198; 296/146.11; 293/120; 16/270
(58) Field of Classification Search
USPC .......... 296/203.01, 193.09, 146.1, 146.11, 98, 296/192, 146.12, 198
See application file for complete search history.

(56) References Cited

U.S. PATENT DOCUMENTS

| | | | |
|---|---|---|---|
| 4,707,020 A * | 11/1987 | Enokida et al. | 296/191 |
| 6,175,991 B1 * | 1/2001 | Driesman et al. | 16/366 |
| 6,698,820 B2 * | 3/2004 | Nakata | 296/193.09 |

FOREIGN PATENT DOCUMENTS

| | | |
|---|---|---|
| FR | 2 833 320 A1 | 6/2003 |
| FR | 2 880 378 A1 | 7/2006 |
| JP | 02-040079 U | 3/1987 |
| JP | 02-007080 U | 1/1990 |
| JP | 02-42812 U | 3/1990 |
| JP | 5-155357 A | 6/1993 |
| JP | 06-48320 A | 2/1994 |
| JP | 11 020743 A | 1/1999 |

OTHER PUBLICATIONS

International Search Report issued Mar. 24, 2010 in PCT/IB2009/007791 and Written Opinion.
Partial Translation of Office Action issued Sep. 11, 2012 in JP 2008-330856.

* cited by examiner

*Primary Examiner* — Glenn Dayoan
*Assistant Examiner* — Pinel Romain
(74) *Attorney, Agent, or Firm* — Kenyon & Kenyon LLP (57) ABSTRACT

An end-side portion of a front door is pivotably mounted to a hinge base portion of a door hinge member. A link portion of the door hinge member is formed integrally with the hinge base portion, and links between a rear end-side mounting portion of a fender panel, and a front pillar. The link portion is provided with a fender fastening portion to which the rear end-side mounting portion of the fender panel is fastened, and which serves a purpose of positioning the rear end-side mounting portion.

10 Claims, 5 Drawing Sheets

VEHICLE FENDER PANEL MOUNTING STRUCTURE

This is a 371 national phase application of PCT/IB2009/007791 filed 17 Dec. 2009, claiming priority to Japanese Patent Application No. 2008-330856 filed 25 Dec. 2008, the contents of which are incorporated herein by reference.

BACKGROUND OF THE INVENTION

1. Field of the Invention

The invention relates to a vehicle fender panel mounting structure where a rear end-side mounting portion of a fender panel is mounted on a vehicle body-side component member side.

2. Description of the Related Art

In a front fender (fender panel), a rear end portion thereof is bent at a parting line portion between the front fender and a front door, to a front pillar side, and is disposed so as not to interfere with a movement locus of the front door. For example, sometimes in the case where the front fender is made of resin, a distal end side of a rear end portion of the front fender is fixed to the front pillar via a bracket (e.g., Japanese Patent Application Publication No. 5-155357 (JP-A-5-155357)).

However, in this construction, the relative position of the front fender to the front door changes depending on variations of the mounting position of the bracket to the front pillar.

SUMMARY OF THE INVENTION

The invention provides a vehicle fender panel mounting structure capable of easily reducing the variation in the relative position of the fender panel to the front door.

A first aspect of the invention relates to a vehicle fender panel mounting structure. This mounting structure has: a fender panel which is disposed at a side surface of a front portion of a vehicle body, at a vehicle front side of a front door, and whose front door-side end is provided with a rear end-side mounting portion; a vehicle body-side component member disposed further inward in a vehicle width direction than the rear end-side mounting portion; and a door hinge member that is mounted to the vehicle body-side component member, and that includes: a hinge base portion to which an end of the front door is mounted so that another end side of the front door pivots; and a link portion that allows the rear end-side mounting portion to be fastened to a predetermined position on the link portion, and that links the rear end-side mounting portion and the vehicle body-side component member. In this mounting structure, the rear end-side mounting portion is fastened to a predetermined position on the link portion.

According to the foregoing construction, the fender panel is disposed at a side surface of a front portion of the vehicle body, at a vehicle front side of a front door, and the rear end-side mounting portion of the fender panel is disposed at a side of a parting line portion between the fender panel and the front door, and the vehicle body-side component member is disposed further inward in the vehicle width direction than the rear end-side mounting portion of the fender panel. Besides, the door hinge member is mounted to the vehicle body-side component member, and an end-side portion of the front door is pivotably mounted to the hinge base portion of the door hinge member.

The link portion of the door hinge member is disposed integrally with the hinge base portion, and links the rear end-side mounting portion of the fender panel and the vehicle body-side component member. This link portion is provided with the fender fastening portion to which the rear end-side mounting portion of the fender panel is fastened, and which serves the purpose of positioning the rear end-side mounting portion. Thus, the rear end-side mounting portion of the fender panel and the front door are both mounted to the vehicle body-side component member via the door hinge member.

Besides, the fender fastening portion to which the rear end-side mounting portion of the fender panel is fastened also serves the purpose of positioning the rear end-side mounting portion of the fender panel. Therefore, variation in the relative position of the fender panel to the front door can easily be restrained.

In the mounting structure in accordance with the foregoing aspect of the invention, the hinge base portion and the link portion may be integrally formed.

According to this construction, since the hinge base portion and the link portion are integrally formed to constitute a one-piece member, a predetermined position of the link portion relative to the hinge base portion can be accurately set. Therefore, the relative position of the fender panel to the front door is also accurately set, so that the attachment accuracy of the fender panel improves.

In the mounting structure in accordance with the foregoing aspect of the invention, the link portion may be constructed of a link member that is formed separately from the hinge base portion, and that is fastened together with the hinge base portion and the vehicle body-side component member so as to be disposed integrally with the hinge base portion.

According to this construction, the link portion is constructed or a link member that is formed separately from the hinge base portion. The link member is fastened together with the hinge base portion and the vehicle body-side component member, and is thus disposed integrally with the hinge base portion. Therefore, the production of the door hinge member is easy, and variation in the relative position of the fender fastening portion to the hinge base portion is restrained. Therefore, variation in the relative position of the fender panel to the front door can be restrained in a simple manner.

In the mounting structure in accordance with the foregoing aspect, positional deviation in the vehicle width direction between the front door-side end of the fender panel whose rear end-side mounting portion is fastened to the predetermined position, and a fender panel-side end of the front door may be restrained.

In the mounting structure in accordance with the foregoing aspect, the front door-side end of the fender panel whose rear end-side mounting portion is fastened to the predetermined position, and the fender panel-side end of the front door may be substantially parallel to each other.

In the mounting structure in accordance with the foregoing aspect, the fender panel may be disposed so as to avoid a range of pivot of the front door.

In the mounting structure in accordance with the foregoing aspect, the fender panel may be made of resin.

In the mounting structure in accordance with the foregoing aspect, a shape of the link portion may be a platy shape that has a main surface in a direction of fastening between the rear end-side mounting portion and the link portion.

In the mounting structure in accordance with the foregoing aspect, a direction of fastening between the rear end-side mounting portion and the link portion may be a vehicle longitudinal direction.

In the mounting structure in accordance with the foregoing aspect, a direction of fastening between the rear end-side mounting portion and the link portion may be a vehicle width direction.

In the mounting structure in accordance with the foregoing aspect, a direction of fastening between the rear end-side mounting portion and the link portion may be an oblique direction relative to the vehicle longitudinal direction.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

A vehicle fender panel mounting structure 12 in accordance with a first embodiment of the invention will be described with reference to FIG. 1 to FIG. 3. In these drawings, an arrow FR indicates a front side of the vehicle, and an arrow UP indicates an upward side of the vehicle, and an arrow IN indicates an inward side in the width direction of the vehicle.

Figure 1:
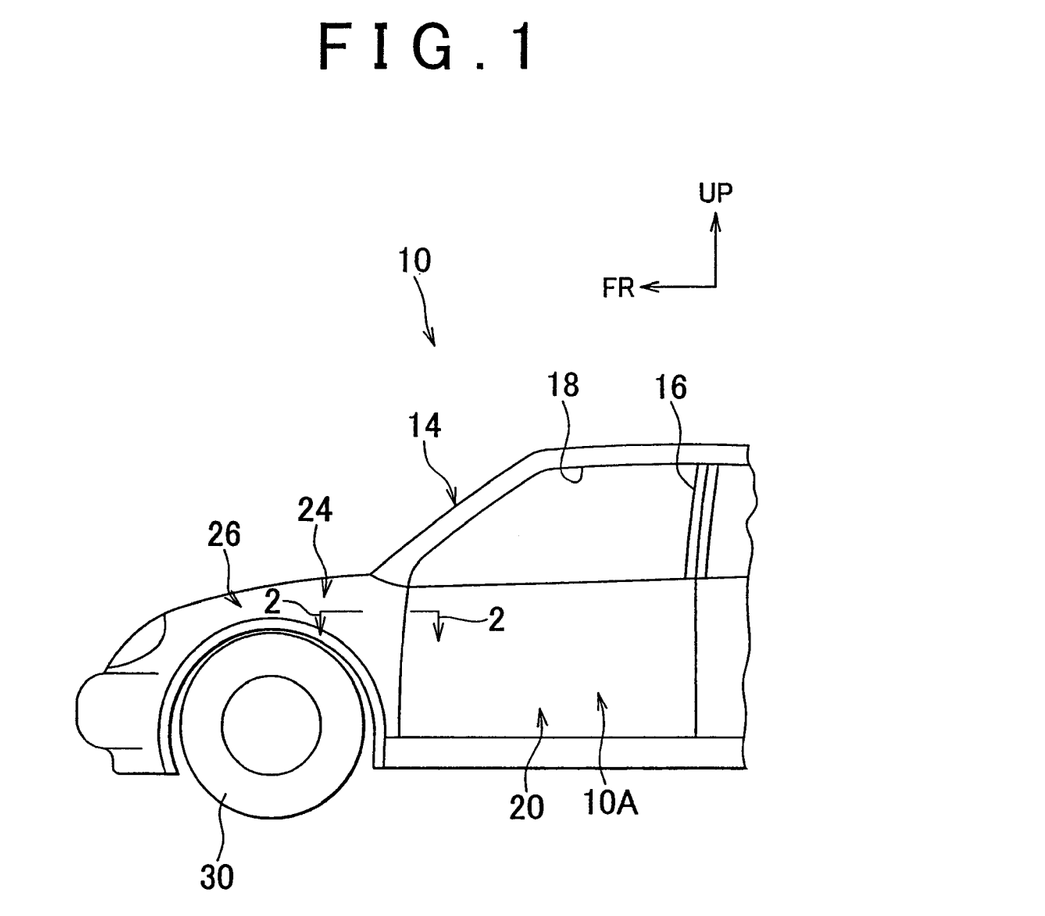
FIG. 1 is a side view a portion of a vehicle to which a vehicle fender panel mounting structure in accordance with a first embodiment of the invention is applied.

FIG. 1 shows a portion of a vehicle 10 to which the vehicle fender panel mounting structure 12 (see FIG. 2) in accordance with the embodiment is applied, in a side view. As shown in FIG. 1, a front pillar 14 as a vehicle body-side component member is disposed at a forward side of the vehicle body side portion 10A in the longitudinal direction of the vehicle. The front pillar 14 extends substantially in an up-down direction of the vehicle, and forms a front edge portion of a front door opening portion 18 in the longitudinal direction of the vehicle.

An intermediate portion of the vehicle body side portion 10A in the longitudinal direction is provided with a center pillar 16. The center pillar 16 extends substantially in the up-down direction of the vehicle, and forms a rear edge portion of the front door opening portion 18 in the longitudinal direction of the vehicle. A front door 20 (front side door) is disposed between the front pillar 14 and the center pillar 16.

Figure 2:
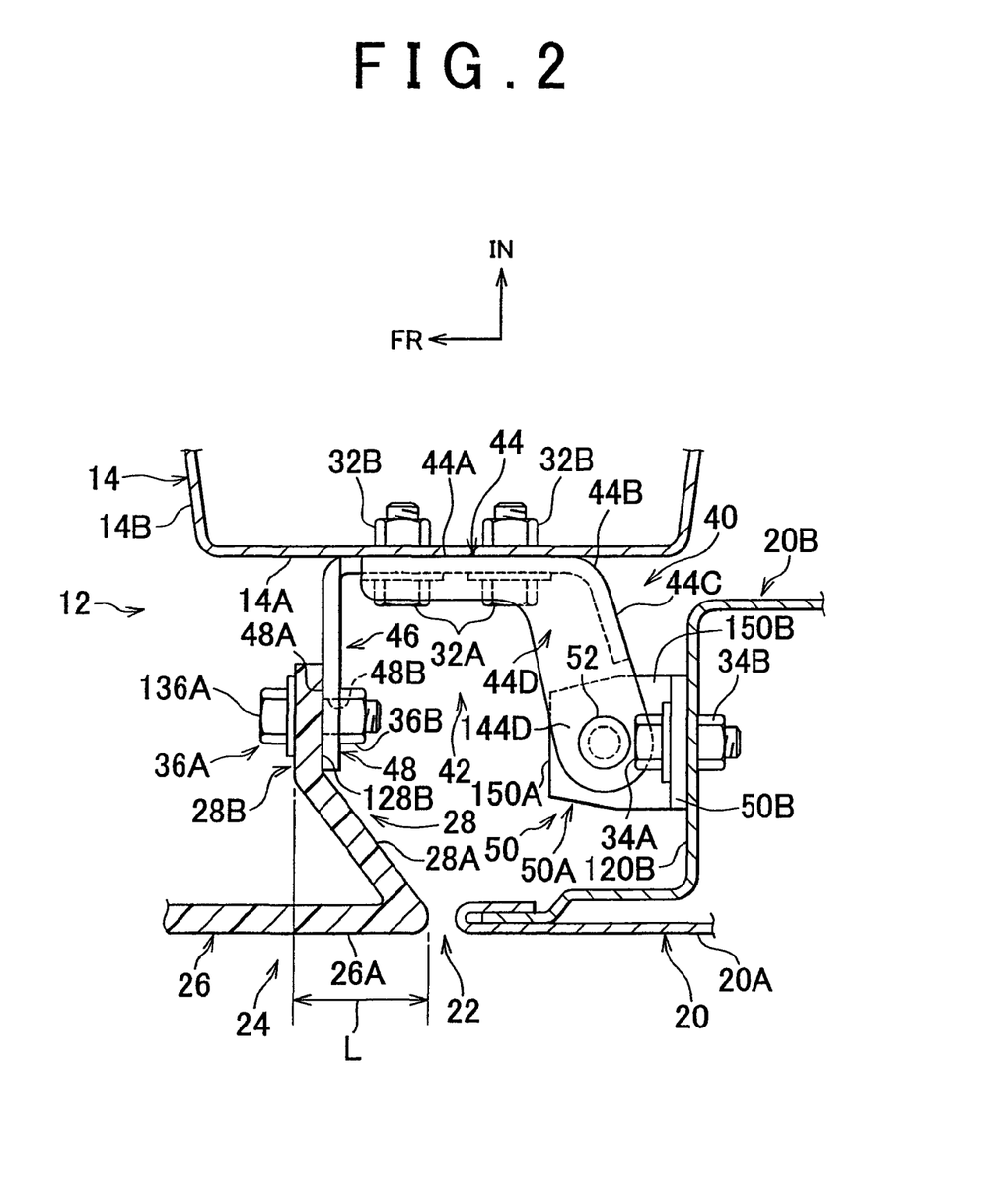
FIG. 2 is an enlarged sectional view taken along line II-II in FIG. 1.

FIG. 2 shows an enlarged view taken along line II-II in FIG. 1. As shown in FIG. 2, the front door 20 includes a door outer panel 20A that forms a door external plate, and a door inner panel 20B that forms a door internal plate thereof. A front end portion of the door inner panel 20B is formed in the shape of stairs, and is provided with a hinge mounting portion 120B whose planar direction is a vehicle width direction. The hinge mounting portion 120B (an end side of the front door 20) is mounted to the front pillar 14 via a door hinge member 40 (described in detail later) so that the front door 20 is pivotable about the hinge mounting portion 120B.

As shown in FIG. 1, at a vehicle front side from the front door 20, a fender panel 24 is disposed at a side surface of a front portion of the vehicle body. The fender panel 24 in this embodiment is made of resin, and has an outside wall portion 26 that forms a designed surface. The outside wall portion 26 is disposed at a vehicle upper side from a front wheel 30. Besides, the fender panel 24 is also provided with an inside wall portion (not shown) that extends from an upper end portion of the outside wall portion 26, and that is bent horizontally toward an engine room (not shown). An end portion of the inside wall portion is mounted to an apron upper member (not shown) via an impact absorption bracket (not shown).

Figure 3:
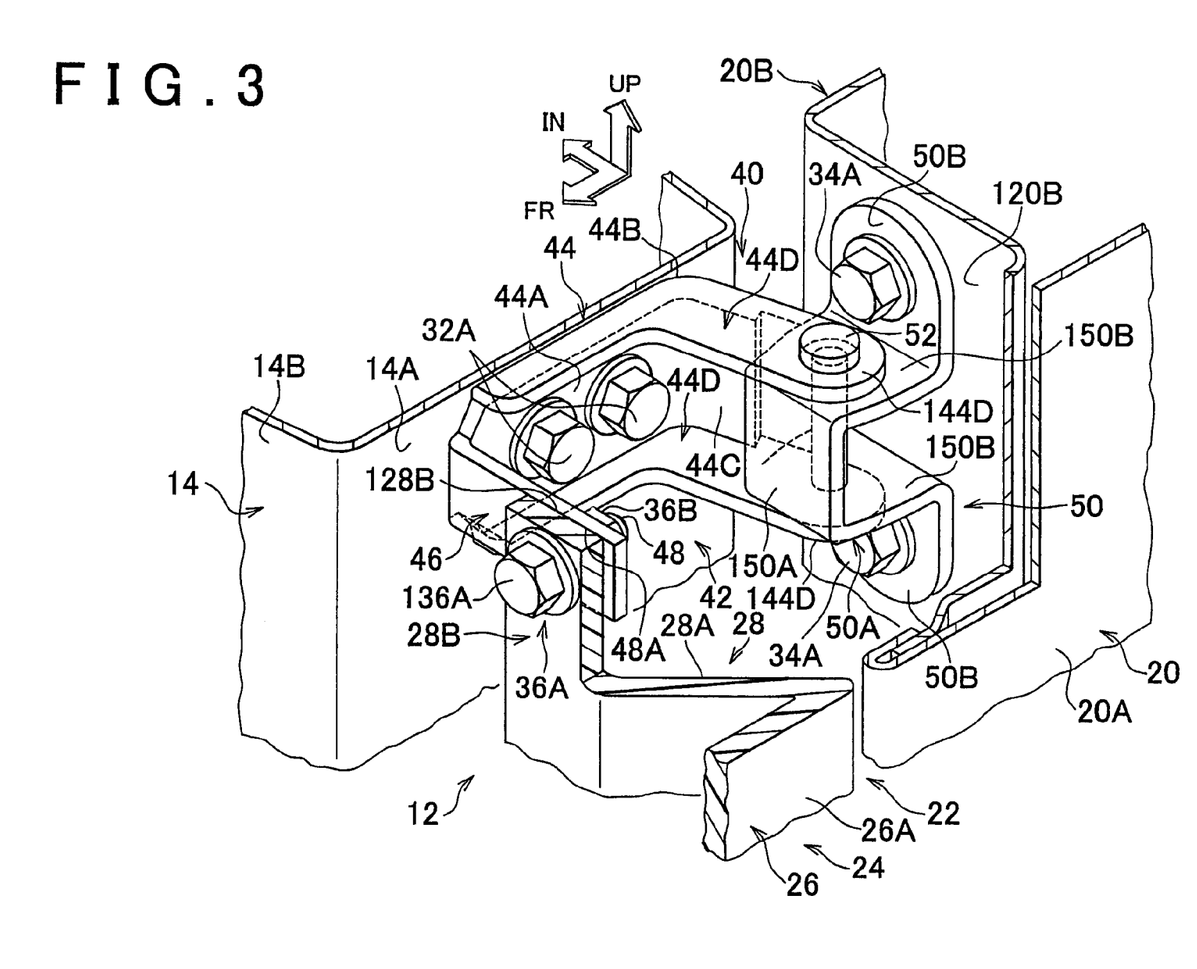
FIG. 3 is a perspective view of portions of the vehicle fender panel mounting structure in accordance with the first embodiment of the invention.

FIG. 3 shows portions of the vehicle fender panel mounting structure 12 in accordance with the embodiment, in a perspective view. As shown in FIG. 2 and FIG. 3, the fender panel 24 has a rear end-side mounting portion 28 that is bent inward in the vehicle width direction, at a parting line portion 22 between the fender panel 24 and the front door 20. The rear end-side mounting portion 28 of the fender panel 24 which is disposed at a parting line portion 22 side includes an inclined wall portion 28A that is bent from a rear end of the outside wall portion 26 and that extends inward in the vehicle width direction and is inclined toward the vehicle front, and a mounting end portion 28B that is bent from an inward end portion of the inclined wall portion 28A which is an inward end in the vehicle width direction, and that extends inward substantially in the vehicle width direction.

The inclined wall portion 28A is inclined relative to the vehicle width direction in order to avoid interference with the movement locus of the front door 20. Besides, a portion of the fender panel 24 that is made up of the inclined wall portion 28A and a rear end portion 26A of the outside wall portion 26 that is positioned outward of the inclined wall portion 28A in the vehicle width direction is a so-called undercut portion at the time of resin molding. Therefore, the length L of this portion in the vehicle longitudinal direction (see FIG. 2) is shorter than the length of a corresponding portion in the case of a steel-made fender panel that is capable of being shift-bent. Specifically, in the case of a steel-made fender panel, the length of the inclined wall portion 28A in the oblique direction can be increased, and a mounting end portion that is bent from an inward end portion of the inclined wall portion 28A located inward in the vehicle width direction and that extends inward substantially in the vehicle width direction can be fastened to a front wall portion 14B of the front pillar 14 that is located toward the vehicle front. However, in the case where the fender panel 24 is made of resin, constraints in the molding (in the molding die structure) make it difficult to set a great length of inclined wall portion 28A in the inclined direction, and therefore the length of the inclined wall portion 28A in the inclined direction is short.

The mounting end portion 28B extending from the inward end portion of the inclined wall portion 28A that is located inward in the vehicle width direction is disposed further outward in the vehicle width direction than the front pillar 14. In other words, the front pillar 14 is disposed further inward in the vehicle width direction than the rear end-side mounting portion 28. A male hinge 42 of the door hinge member 40 is mounted on the front pillar 14. The door hinge member 40 is made up of a steel-made member that is high in rigidity and high in dimensional accuracy. As for the male hinge 42 constituting the door hinge member 40, a mounting base portion 44A thereof whose planar direction is the vehicle longitudinal direction is fixed to an outward side surface 14A of the front pillar 14 which faces outward in the vehicle width direction, by bolts 32A and nuts 32B (see FIG. 2).

The male hinge 42 is formed so as to have a generally letter U-shape that is open outward in the vehicle width direction in a plan view in the vehicle longitudinal direction, and a portion of the male hinge 42 that has a generally letter L-shape in a plan view, with a front end side portion thereof in the vehicle longitudinal direction being removed, is a hinge base portion 44. The hinge base portion 44 has an extended portion 44C that is extended outward in the vehicle width direction from a rear end portion of the mounting base portion 44A via a curved portion 44B that is rounded, and flange portions 44D that extend horizontally from an upper end and a lower end of the mounting base portion 44A and the extended portion 44C. A rear end side portion of each flange portion 44D is provided with a support piece portion 144D that extends further outward in the vehicle width direction than an outward end portion of the extended portion 44C in the vehicle width direction.

A protruded portion 50A of a female hinge 50 is disposed between the foregoing two support piece portions 144D. The support piece portions 144D of the male hinge 42, and the protruded portion 50A of the female hinge 50 are penetrated by a hinge pin (hinge shaft) 52 in the vehicle up-down direction. Therefore, the female hinge 50 is linked to the hinge base portion 44 of the male hinge 42 so as to be freely rotatable about the hinge pin 52.

As shown in FIG. 3, a shape of the female hinge 50 in a view taken in the vehicle width direction is a hat shape whose opening faces the hinge mounting portion 120B of the door inner panel 20B. That is, the female hinge 50 is provided with the protruded portion 50A that is protruded from the hinge mounting portion 120B side, and a pair of upper and lower mounting flange portions 50B that extend from hinge mounting portion 120B-side end portions of the protruded portion 50A in such directions as to extend away from each other. Besides, the protruded portion 50A is provided with a vertical wall portion 150A that is disposed substantially parallel to the hinge mounting portion 120B, with a space left therebetween, and also has a pair of upper and lower horizontal wall portions 150B that extend horizontally from upper and lower ends of the vertical wall portion 150A to the hinge mounting portion 120B side.

The upper and lower end mounting flange portions 50B of the female hinge 50 are fixed to the hinge mounting portion 120B by bolts 34A and nuts 34B (see FIG. 2).

Therefore, the hinge mounting portion 120B of the front door 20 (an end side thereof) is mounted to the hinge base portion 44 via the female hinge 50 so that the front door 20 is pivotable about the hinge mounting portion 120B.

A front end-side portion of the male hinge 42 in the vehicle longitudinal direction is formed as a link portion 46. The link portion 46 is formed integrally with the hinge base portion 44 to constitute therewith the male hinge 42 (a one-piece member), that is, is disposed integrally with the hinge base portion 44, and serves as a portion that links the rear end-side mounting portion 28 of the fender panel 24 and the front pillar 14. These link portion 46 is bent from a front end portion of the mounting base portion 44A, at an angle of substantially 90° outward in the vehicle width direction.

An outward end-side portion of the link portion 46 in the vehicle width direction is provided as a fender fastening portion 48. The fender fastening portion 48 is disposed at a position located midway between the positions of the upper and lower mounting flange portions 50B in the vehicle up-down direction in a front elevational view of the vehicle. A mounting end portion 28B (meeting surface 128B) of the rear end-side mounting portion 28 of the fender panel 24 is superimposed on a front surface 48A of the fender fastening portion 48 that faces the vehicle forward side.

As shown in FIG. 2, a bolt insert hole 48B through which a bolt 36A is inserted is formed through the fender fastening portion 48. The bolt 36A extends through the mounting end portion 28B from the vehicle front side, and also extends through the bolt insert hole 48B of the fender fastening portion 48. A nut 36B is screwed onto the bolt 36A from the vehicle rear side of the fender fastening portion 48. Thus, the mounting end portion 28B and the fender fastening portion 48 are fastened between the nut 36B and a head portion 136A of the bolt 36A.

As in the foregoing manner, the mounting end portion 28B of the rear end-side mounting portion 28 of the fender panel 24 is fastened to the fender fastening portion 48 of the link portion 46 of the male hinge 42. That is, the counter part to which the rear end-side mounting portion 28 (the mounting end portion 28B) of the fender panel 24 is fastened is set to be the door hinge member 40 (the fender fastening portion 48).

The direction of this fastening is the vehicle longitudinal direction. It is to be noted herein that the bolt insert hole 48B of the fender fastening portion 48 serves as a positioning reference hole for positioning the rear end-side mounting portion 28 in the vehicle width direction and the vehicle up-down direction (in other words, in planar directions of the meeting surface 128B). Besides, the front surface 48A of the fender fastening portion 48 serves as a positioning reference surface for positioning the rear end-side mounting portion 28 in the vehicle longitudinal direction (in other words, in the axis direction of the bolt 36A). That is, the fender fastening portion 48 is used for positioning the rear end-side mounting portion 28 (used as a positioning reference portion for the rear end-side mounting portion 28).

Next, operation and effects of the embodiment will be described.

The door hinge member 40 is mounted to the front pillar 14, and an end side of the front door 20 is mounted to the hinge base portion 44 of the door hinge member 40 so that the front door 20 is pivotable about the hinge mounting portion 120B. On the other hand, the link portion 46 of the door hinge member 40 is provided integrally with the hinge base portion 44, and links the rear end-side mounting portion 28 of the fender panel 24 and the front pillar 14.

The rear end-side mounting portion 28 of the fender panel 24 is fastened to the link portion 46. The link portion 46 is provided with the fender fastening portion 48 that serves the purpose of the positioning the rear end-side mounting portion 28 as well. Thus, both the rear end-side mounting portion 28 of the fender panel 24 and the front door 20 are mounted to the front pillar 14 side via the door hinge member 40. Besides, the fender fastening portion 48 to which the rear end-side mounting portion 28 of the fender panel 24 is fastened also serves the purpose of positioning the rear end-side mounting portion 28 of the fender panel 24. Variations in the relative position of the fender panel 24 to the front door 20 can be reduced.

That is, since the bolt insert hole 48B of the fender fastening portion 48 serves as a positioning reference hole for positioning the rear end-side mounting portion 28 of the fender panel 24 in the vehicle width direction and the vehicle up-down direction, and the front surface 48A of the fender fastening portion 48 serves as a positioning reference surface for positioning the rear end-side mounting portion 28 of the fender panel 24 in the vehicle longitudinal direction, it becomes possible to position the front door 20 and the fender panel 24 via the door hinge member 40. Therefore, the position adjustment or the positioning through the use of jigs becomes basically unnecessary, so that good external appearance quality (good looking quality) is secured while the processes are simplified.

Further description will be given in comparison with a fender panel mounting structure in accordance with a comparative example. For example, in a comparative structure in which a rear end-side mounting portion of a resin-made fender panel is mounted to a front pillar via a separate mount bracket; and an end side of a front door is mounted for pivot movements of the front door, to a door hinge member that is provided separately from the mount bracket (apart from the mount bracket), variation in the position of the mount bracket relative to the door hinge member and the front door affects the relative position of the fender panel to the front door. Therefore, this comparative structure has high possibility that the gap or step at the parting line portion between the fender panel and the front door (i.e., positional deviation in the vehicle longitudinal direction or the vehicle width direction) will become large and the external appearance quality will become low. Hence, it generally becomes necessary to perform an adjustment process in order to secure external appearance quality.

Besides, in the comparative structure, in order to adjust the relative position of the fender panel to the front door, it is necessary to provide a structure, for example, in which the bolt insert hole extending through the rear end-side mounting portion of the fender panel and the mount bracket which is formed for fastening the rear end-side mounting portion of the fender panel to the mount bracket is provided as a relief hole that is larger in diameter than the reference hole (i.e., that has hole dimensions that allow a bolt shaft portion to be loosely inserted therethrough), or the like. Furthermore, in order to reduce the gap or the step at the parting line portion between the fender panel and the front door in a structure that is provided with the relief hole, the relative position of the fender panel to the front door is adjusted by a jig or the like before the rear end-side mounting portion of the fender panel is fastened to the mount bracket. Thus, processes become complicated.

On the other hand, in the vehicle fender panel mounting structure 12 in accordance with the embodiment, the rear end-side mounting portion 28 of the fender panel 24, and the front door 20 are mounted to the front pillar 14 side via the door hinge member 40, and the fender fastening portion 48 of the door hinge member 40 also serves the purpose of positioning the rear end-side mounting portion 28 of the fender panel 24. Therefore, the adjustment process for adjusting the gap or the step of the parting line portion 22 between the fender panel 24 and the front door 20 becomes basically unnecessary. That is, good attachment of the fender panel 24 and the front door 20 can be realized without a need to adjust the position of the fender panel 24. That is, the positional deviation in the vehicle width direction between the front door 20-side end of the fender panel 24 and the fender panel 24-side end of the front door 20 is restrained, and the ends thereof become substantially parallel to each other.

In particular, in the vehicle fender panel mounting structure 12 in accordance with the embodiment, the hinge base portion 44 and the link portion 46 are integrally formed to constitute a one-piece male hinge 42, so that the relative position of the fender fastening portion 48 to the hinge base portion 44 is very accurately set. Therefore, the relative position of the fender panel 24 to the front door 20 is also very accurately set, so that the attachment accuracy of the fender panel 24 improves.

As described above, according to the vehicle fender panel mounting structure 12 in accordance with the embodiment, variation in the relative position of the fender panel 24 to the front door 20 can easily be restrained.

Figure 4:
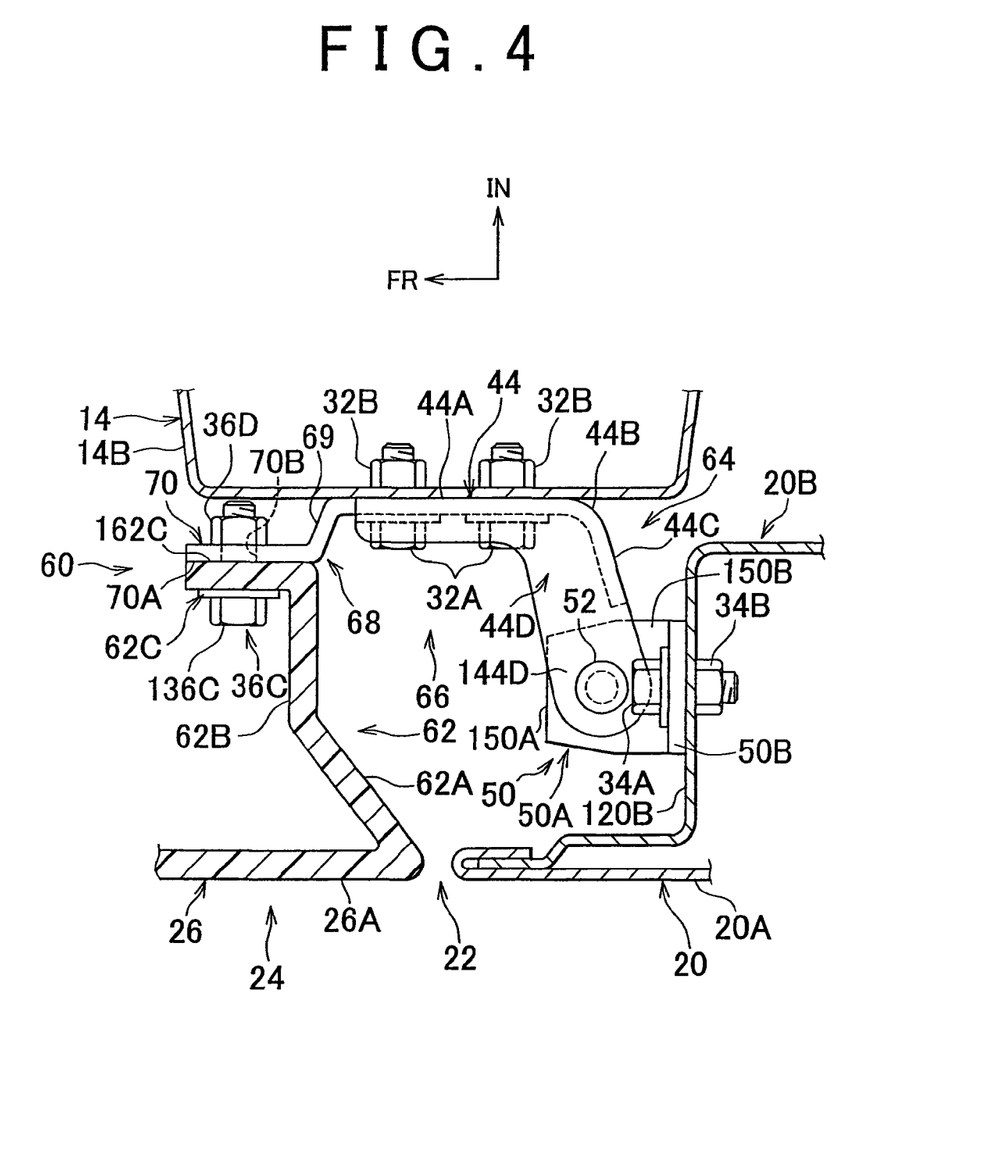
FIG. 4 is a horizontal sectional view of a vehicle fender panel mounting structure in accordance with a second embodiment of the invention.

Next, a vehicle fender panel mounting structure 60 in accordance with a second embodiment of the invention will be described with reference to FIG. 4. FIG. 4 shows a vehicle fender panel mounting structure 60 in accordance with the second embodiment of the invention in a horizontal sectional view (a sectional view corresponding to the view in FIG. 2 in the first embodiment).

As shown in FIG. 4, the vehicle fender panel mounting structure 60 is different from the vehicle fender panel mounting structure 12 (see FIG. 2) in accordance with the first embodiment, in that the direction of fastening between a fender panel 24 and a door hinge member 64 is the vehicle width direction. Other constructions are substantially the same as those of the first embodiment. Therefore, substantially the same construction portions as those of the first embodiment are represented by the same reference characters, and descriptions thereof are omitted below.

As shown in FIG. 4, the fender panel 24 is bent inward in the vehicle width direction at a parting line portion 22 between the fender panel and a front door 20. Thus, a rear end-side mounting portion 62 of the fender panel 24 is formed. The rear end-side mounting portion 28 of the fender panel 24 which is disposed at a parting line portion 22 side includes an inclined wall portion 62A that is bent from a rear end of an outside wall portion 26 and that extends inward in the vehicle width direction and is inclined toward the vehicle front, an intermediate wall portion 62B that is bent from an inward end portion of the inclined wall portion 62A which is an inward end in the vehicle width direction, and that extends inward substantially in the vehicle width direction, and a mounting end portion 62C that is bent from an inward end portion of the intermediate wall portion 62B in the vehicle width direction, at an angle of substantially 90° forward, and that extends to the vehicle front side. This rear end-side mounting portion 62 is disposed outward of the front pillar 14 in the vehicle width direction.

A male hinge 66 of the door hinge member 64 is mounted on the front pillar 14. A front end-side portion of the male hinge 66 in the vehicle longitudinal direction is formed as a link portion 68. The link portion 68 is formed integrally with a hinge base portion 44, and constitutes the male hinge 66 (a one-piece member), that is, disposed integrally with the hinge base portion 44, and serves as a portion that links the rear end-side mounting portion 62 of the fender panel 24 and the front pillar 14.

The link portion 68 includes an inclined portion 69 that is bent from a front end portion of the mounting base portion 44A and that extends toward the vehicle front and is inclined outward in the vehicle width direction, and a fender fastening portion 70 that is bent from an outward end of the inclined portion 69 in the vehicle width direction and that extends to the vehicle front side. The mounting end portion 62C (a meeting surface 162C) of the rear end-side mounting portion 62 of the fender panel 24 is superimposed, from outward in the vehicle width direction, onto an outside surface 70A of the fender fastening portion 70 that faces outward in the vehicle width direction.

Besides, a bolt insert hole 70B through which a bolt 36C is inserted is formed through the fender fastening portion 70. The bolt 36C extends through the mounting end portion 62C from outward in the vehicle width direction, and also extends through the bolt insert hole 70B of the fender fastening portion 70. A nut 36D is screwed onto the bolt 36C from an inward side of the fender fastening portion 70 in the vehicle width direction. Thus, the mounting end portion 62C and the fender fastening portion 70 are fastened between the nut 36D and a head portion 136C of the bolt 36C.

As in the foregoing manner, the mounting end portion 62C of the rear end-side mounting portion 62 of the fender panel 24 is fastened to the fender fastening portion 70 of the link portion 68 of the male hinge 66. It is to be noted herein that the bolt insert hole 70B of the fender fastening portion 70 serves as a positioning reference hole for positioning the rear end-side mounting portion 62 in the vehicle longitudinal direction and the vehicle up-down direction (in other words, in planar directions of the meeting surface 162C). Besides the outside surface 70A of the fender fastening portion 70 serves as a positioning reference surface for positioning the rear end-side mounting portion 62 in the vehicle longitudinal direction (in other words, in the axis direction of the bolt 36C). That is, the fender fastening portion 70 is used for positioning the rear end-side mounting portion 62.

Thus, the construction of this embodiment also achieves substantially the same operation and effects as the construction of the first embodiment.

Figure 5:
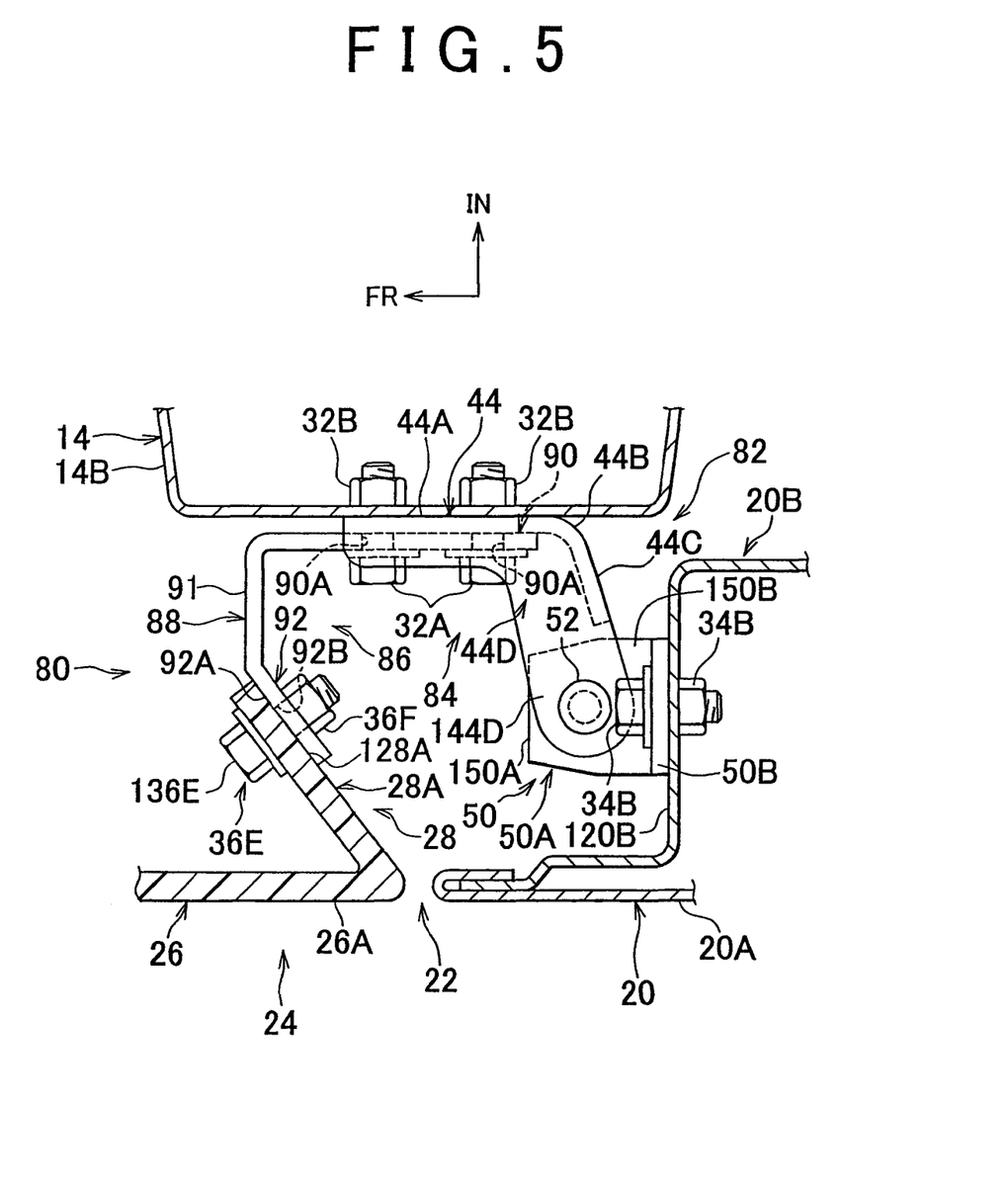
FIG. 5 is a horizontal sectional view of a vehicle fender panel mounting structure in accordance with a third embodiment of the invention.

Next, a vehicle fender panel mounting structure 80 in accordance with a third embodiment of the invention will be described with reference to FIG. 5. FIG. 5 shows a vehicle fender panel mounting structure 80 in accordance with the third embodiment of the invention in a horizontal sectional view (a sectional view corresponding to the view in FIG. 2 in the first embodiment).

As shown in FIG. 5, the vehicle fender panel mounting structure 80 is different from the vehicle fender panel mounting structure 12 of the first embodiment (see FIG. 2), for example, in that a link portion 86 is constructed of a mount bracket 88 that is provided as a link member, and the mount bracket 88 is fastened together with a hinge base portion 44 and a front pillar 14, and is thus disposed integrally with the hinge base portion 44, and in that the direction of the fastening between a fender panel 24 and a door hinge member 82 is an oblique direction relative to the vehicle longitudinal direction. Other constructions of the third embodiment are substantially the same as those of the first embodiment. Therefore, substantially the same construction portions as those of the first embodiment are represented by the same reference characters, and descriptions thereof are omitted below.

As shown in FIG. 5, a rear end-side mounting portion 28 of the fender panel 24 is constructed only of an inclined wall portion 28A that is bent from a rear end of an outside wall portion 26, and that extends inward in the vehicle width direction and is inclined to the vehicle front side. Besides, a male hinge 84 is constructed only of the hinge base portion 44.

Besides, the link portion 86 is constructed of the mount bracket 88 that is formed separately from the male hinge 84 (from the hinge base portion 44). The mount bracket 88 is formed in a bent plate shape, and is provided with a mounting base portion 90. The mounting base portion 90 is superimposed on an outer side of the mounting base portion 44A of the hinge base portion 44 which is outward in the vehicle width direction. Bolt insert holes 90A through which bolts 32A are inserted are formed through the mounting base portion 90. The mount bracket 88 is disposed integrally with the hinge base portion 44 due to the fastening of the mounting base portion 90 of the mount bracket 88 together with the mounting base portion 44A of the hinge base portion 44 and the front pillar 14 by the bolts 32A and nuts 32B.

The link portion 86 includes an intermediate portion 91 that is bent from a front end portion of the mounting base portion 90 at an angle of substantially 90° so as to extend outward in the vehicle width direction, and a fender fastening portion 92 that is bent from an outward end portion of the intermediate portion 91 in the vehicle width direction, and that extends toward the rear of the vehicle and is inclined outward in the vehicle width direction. The rear end-side mounting portion 28 of the fender panel 24 (a meeting surface 128A of the inclined wall portion 28A) is superimposed on a front surface 92A of the fender fastening portion 92 from a side that is obliquely forward relative to the vehicle and outward in the vehicle width direction.

A bolt insert hole 92B through which a bolt 36E is inserted is formed through the fender fastening portion 92. The bolt 36E extends through the inclined wall portion 28A from the obliquely forward side that is outward in the vehicle width direction, and also extends through the bolt insert hole 92B of the fender fastening portion 92. A nut 36F is screwed onto the bolt 36E from a side of the fender fastening portion 92 that is obliquely rearward relative to the vehicle and inward in the vehicle width direction. Thus, the inclined wall portion 28 and the fender fastening portion 92 are fastened between the nut 36F and a head portion 136E of the bolt 36E.

As in the foregoing manner, the rear end-side mounting portion 28 (the inclined wall portion 28A) of the fender panel 24 is fastened to the fender fastening portion 92 of the link portion 86 of the door hinge member 82. The bolt insert hole 92B of the fender fastening portion 92 serves as a positioning reference hole for positioning the rear end-side mounting portion 28 in the vehicle up-down direction, and in the direction that is obliquely forward and toward a side that is inward in the vehicle width direction and is also obliquely rearward and toward a side that is outward in the vehicle width direction (in other words, for positioning the rear end-side mounting portion 28 in planar directions of the meeting surface 128A). Besides, the front surface 92A of the fender fastening portion 92 serves as a positioning reference surface for positioning the rear end-side mounting portion 28 in the direction that is obliquely forward and toward a side that is outward in the vehicle width direction and is also obliquely rearward and toward a side that is inward in the vehicle width direction. That is, the fender fastening portion 92 is used for positioning the rear end-side mounting portion 28.

According to the foregoing construction of this embodiment, the production of the door hinge member 82 is easy, and variations in the relative position of the fender fastening portion 92 to the hinge base portion 44 can be reduced. Therefore, variations in the relative position of the fender panel 24 to the front door 20 can easily be reduced, and good attachment of the fender panel 24 can be realized. Incidentally, in the construction of this embodiment as described above, weight reduction can easily be achieved by using a thin plate material for the mount bracket 88.

Although in each of the foregoing embodiments, the door hinge member 40, 64, or 82 is mounted to the front pillar 14 that is provided as a vehicle body-side component member, it suffices that the vehicle body-side component member is a vehicle body-side component member that is capable of supporting the door hinge member, and the vehicle body-side component member may also be a component part that is not the front pillar 14, but that is mounted to the front pillar 14.

Besides, although in the third embodiment, the mount bracket 88, which constitutes the link portion 86, is disposed integrally with the hinge base portion 44 due to the fastening of the mounting base portion 90 of the mount bracket 88 together with the mounting base portion 44A of the hinge base portion 44 and the front pillar 14, the link portion may also be a member that is formed separately from the hinge base portion, and that is mounted to the hinge base portion by fastening, welding (e.g., ark welding), etc., and therefore is unified with the hinge base portion (disposed integrally with the hinge base portion). Besides, the link portion and the hinge base portion may also be unified, and the hinge base portion of the unit may be mounted to the vehicle body-side component member.

Besides, although in the third embodiment, the mount bracket 88 having a shape as shown in FIG. 5 is provided as a link member, and is fastened together with the hinge base portion 44 and the front pillar 14, the link member may also be, for example, a link member that has another shape, such as a link arm or the like, and that includes a mounting base portion that is mounted to the hinge base portion, and a fender fastening portion that is protruded from a front end-side portion of the mounting base portion to an outer side in the vehicle width direction.

While some embodiments of the invention have been illustrated above, it is to be understood that the invention is not limited to details of the illustrated embodiments, but may be embodied with various changes, modifications or improvements, which may occur to those skilled in the art, without departing from the scope of the invention.

The invention claimed is:

1. A vehicle fender panel mounting structure comprising:
a fender panel which is made of resin and which is disposed at a side surface of a front portion of a vehicle body, at a vehicle front side of a front door, and a mounting portion of the fender panel including an inclined wall portion that extends inward in a vehicle width direction and is inclined toward a vehicle front so as to allow the front door to pivot alongside the inclined wall portion, wherein the inclined wall portion and the side surface of the front portion of the vehicle body form an oblique angle;
a vehicle body-side component member disposed further inward in the vehicle width direction than the mounting portion;
a door hinge member that is mounted to the vehicle body-side component member, and that includes:
a hinge base portion to which an end of the front door is mounted so that another end side of the front door pivots; and
a link portion that links the mounting portion and the vehicle body-side component member,
wherein the mounting portion is fastened to a predetermined position on the link portion.

2. The mounting structure according to claim 1, wherein the hinge base portion and the link portion are integrally formed.

3. The mounting structure according to claim 1, wherein the link portion is constructed of a link member that is formed separately from the hinge base portion, and that is fastened together with the hinge base portion and the vehicle body-side component member so as to be disposed integrally with the hinge base portion.

4. The mounting structure according to claim 1, wherein positional deviation in the vehicle width direction between a front door-side end of the fender panel whose mounting portion is fastened to the predetermined position, and a fender panel-side end of the front door is restrained.

5. The mounting structure according to claim 1, wherein a front door-side end of the fender panel whose mounting portion is fastened to the predetermined position, and a fender panel-side end of the front door are substantially parallel to each other.

6. The mounting structure according to claim 1, wherein the fender panel is disposed so as to avoid a range of pivot of the front door.

7. The mounting structure according to claim 1, wherein a shape of the link portion is a platy shape that has a main surface in a direction of fastening between the mounting portion and the link portion.

8. The mounting structure according to claim 1, wherein a direction of fastening between the mounting portion and the link portion is a vehicle longitudinal direction.

9. The mounting structure according to claim 1, wherein a direction of fastening between the mounting portion and the link portion is a vehicle width direction.

10. The mounting structure according to claim 1, wherein a direction of fastening between the mounting portion and the link portion is an oblique direction relative to the vehicle longitudinal direction.

* * * * *